United States Patent
Kurihara et al.

(10) Patent No.: US 7,555,890 B2
(45) Date of Patent: Jul. 7, 2009

(54) FAST START-UP COMBINED CYCLE POWER PLANT

(75) Inventors: Tadashi Kurihara, Tokyo (JP); Toshinori Shigenaka, Hiroshima (JP); Kazuhiro Takenaga, Hiroshima (JP); Shoji Nagai, Chiba (JP); Shinichi Taniguchi, Tokyo (JP)

(73) Assignees: Hitachi, Ltd., Tokyo (JP); The Tokyo Electric Power Company, Incorporated, Tokyo (JP); Babcock-Hitachi K.K., Tokyo (JP)

( * ) Notice: Subject to any disclaimer, the term of this patent is extended or adjusted under 35 U.S.C. 154(b) by 514 days.

(21) Appl. No.: 11/131,234

(22) Filed: May 18, 2005

(65) Prior Publication Data
US 2005/0268594 A1  Dec. 8, 2005

(30) Foreign Application Priority Data
May 19, 2004 (JP) .............................. 2004-149047

(51) Int. Cl.
*F02C 6/00* (2006.01)
*F02G 3/00* (2006.01)

(52) U.S. Cl. ..................................... 60/39.182; 60/39.5
(58) Field of Classification Search .............. 60/39.182, 60/39.5
See application file for complete search history.

(56) References Cited

U.S. PATENT DOCUMENTS

| | | | | |
|---|---|---|---|---|
| 3,762,162 A | * | 10/1973 | Miura et al. ................... | 60/711 |
| 4,437,313 A | * | 3/1984 | Taber et al. .................... | 60/665 |
| 4,821,507 A | * | 4/1989 | Bachmann et al. ........ | 60/39.182 |
| 4,989,405 A | * | 2/1991 | Duffy et al. .............. | 60/39.182 |
| 5,299,601 A | * | 4/1994 | Koch .......................... | 137/875 |

FOREIGN PATENT DOCUMENTS

| | | |
|---|---|---|
| JP | 06-026606 | 2/1994 |
| JP | 07-083401 | 3/1995 |
| JP | 07-091602 | 4/1995 |
| JP | 08-075103 | 3/1996 |

\* cited by examiner

*Primary Examiner*—Michael Cuff
*Assistant Examiner*—Gerald L Sung
(74) *Attorney, Agent, or Firm*—Crowell & Moring LLP (57) ABSTRACT

A combined cycle power plant of the present invention is configured of a compressor; a combustor for combusting compressed air compressed by the compressor together with supplied fuel; a gas turbine driven by a combustion gas exhausted from the combustor; a heat recovery steam generator for recovering high temperature exhaust heat exhausted from the gas turbine; a steam turbine driven by steam obtained from the heat recovery steam generator; and an exhaust gas duct having an HRSG inlet duct that is provided between the gas turbine and the heat recovery steam generator and introduces an exhaust passage into the heat recovery steam generator, and a bypass stack that leads the exhaust gas outside, wherein the exhaust duct is configured of a damper, a damper drive for changing any of angle and opening of the damper, and a guide mechanism for preventing a vibration of the damper.

12 Claims, 6 Drawing Sheets

FAST START-UP COMBINED CYCLE POWER PLANT

BACKGROUND OF THE INVENTION

1. Field of the Invention

The present invention relates to a combined cycle power plant that can generate power not only with driving a gas turbine but also with using heat of an exhaust gas from the gas turbine and driving a steam turbine.

2. Description of the Related Art

At this time, from a viewpoint of a resource saving and environment protection a combined cycle power generation that improves a power generation efficiency with combining a gas turbine and a steam turbine that uses exhaust heat thereof is used. A combined cycle power plant that employs the combined cycle power generation is configured by combining the gas turbine, the steam turbine, a heat recovery steam generator, and the like. If the gas turbine is driven, it is designed that an exhaust gas exhausted from the gas turbine is introduced into the heat recovery steam generator, and that the steam turbine is driven with steam produced by the heat recovery steam generator.

But when starting up the combined cycle power plant and directly introducing an exhaust gas of a high temperature exhausted from the gas turbine into the heat recovery steam generator, for example, strains might occur to cause breakage in pipes of the heat recovery steam generator due to a drastic heat input by the exhaust gas. Therefore, in order to prevent the breakage of the heat recovery steam generator, generator, a method of controlling an output of the gas turbine while suppressing the output is adopted there is a problem in that the method that it takes very long time but, for the output of the gas turbine to be raised to a rated load thereof and power taken out. Consequently, a solution for problem is disclosed in paragraphs 0020 to 0028 and FIG. 1 of Japanese Patent Laid-Open Publication Hei. 7-83401 (hereinafter referred to as "patent document 1").

In the technology described in the patent document 1, between a gas turbine and a heat recovery steam generator is provided a bypass stack for bypassing the heat recovery steam generator, and at inlet sides of the heat recovery steam generator and the bypass stack are provided dampers, respectively. In starting up a plant a damper opening of the heat recovery steam generator is set full close, that of the bypass stack is set full open, the gas turbine becomes a rated load operation, and thereafter the damper opening of the heat recovery steam generator is controlled so as to gradually become larger and that of the bypass is controlled so as to become smaller. Thus by providing the damper between the gas turbine and the heat recovery steam generator and making a drastic heat input not occur for the heat recovery steam generator, it is designed that a problem such as a breakage of the heat recovery steam generator can be prevented. In addition, similar damper structures are described in paragraph 0039 and FIGS. 1 and 3 of Japanese Patent Laid-Open Publication Hei. 8-75103 (hereinafter referred to as "patent document 2"), and in paragraph 0012 and FIG. 1 of Japanese Patent Laid-Open Publication Hei. 7-91602 (hereinafter referred to as "patent document 3").

But in suggestions of providing a damper described in the patent documents 1 to 3, because an exhaust gas of a very high pressure is blown into the damper, there is a possibility that only if the damper is simply supported, it fiercely vibrates due to a wind pressure, a strong force acts on such a damper drive for supporting the damper, and thus is damaged. Accordingly, in order not to damage the damper, it is necessary, for example, to form the damper drive, which supports the damper, of a high strength material or to make the damper drive such one that produces a strong motivity as a driving force transmitted to the damper.

In addition, by a vibration occurring in a damper, it becomes unable to highly accurately control an introduction amount introduced into a heat recovery steam generator and a bypass amount of an exhaust gas bypassing the heat recovery steam generator: there is also a possibility that a drastic heat input is produced for the heat recovery steam generator, and that the heat recovery steam generator is damaged.

Furthermore, as a conventional heat recovery steam generator, although a natural circulation type is adopted, it has a drum of a very large thickness: an excessive thermal stress occurs due to a drastic heat inflow; it is necessary to suppress a load up rate in an operation of a damper; and as a result there is such a problem that a start-up time becomes longer.

Consequently, it is strongly requested a combined cycle power plant that can control a damper in high accuracy and widely shorten a start-up time without increasing manufacturing cost thereof.

SUMMARY OF THE INVENTION

A combined cycle power plant of the present invention comprises a compressor; a combustor for combusting compressed air compressed by the compressor together with supplied fuel; a gas turbine driven by a combustion gas exhausted from the combustor; a heat recovery steam generator for recovering high temperature exhaust heat exhausted from the gas turbine; a steam turbine driven by steam obtained from the heat recovery steam generator; and an exhaust gas duct having an HRSG (Heat Recovery Steam Generator) inlet duct that is provided between the gas turbine and the heat recovery steam generator and introduces an exhaust gas into the heat recovery steam generator, and a bypass stack that leads the exhaust gas outside, wherein the exhaust duct comprises a damper, a damper drive for changing any of angle and opening of the damper so that an exhaust amount of the exhaust gas into the bypass stack decreases in increasing an introduction amount of the exhaust gas to the HRSG inlet duct, and a guide mechanism for preventing a vibration of the damper.

The combined cycle power plant of the present invention can effectively prevent the vibration of the damper due to a high pressure of the exhaust gas by supporting the damper drive, which is supported by the damper drive, with the guide mechanism provided at the exhaust gas duct. Thus preventing the vibration of the damper, a durability of the damper and the damper drive can be improved. In addition, by the damper being supported with the exhaust gas duct, a damper opening therefor can be controlled with high accuracy, the introduction amount of the exhaust gas to the heat recovery steam generator and the exhaust amount of the exhaust gas to the bypass stack can be respectively controlled with high accuracy, and a drastic heat input to the heat recovery steam generator can be surely prevented. In addition, in the present invention, in order to ensure a strength, it is not necessary to use a member of a high strength and to mount a damper drive that can bring out a higher driving force.

In addition, the heat recovery steam generator is preferably a once through type.

According to this, because it is not necessary to place a drum of which load up needs to be suppressed in an operation of a damper due to an occurrence of a thermal stress, a start-up time can be widely shortened, an operability can be improved, and it is enabled to reduce running cost.

For example, the damper drive comprises a toggle linkage for supporting the damper and a drive shaft for transmitting a driving force to the toggle linkage, wherein when the damper reaches a position that shuts off any of the bypass stack and the HRSG inlet duct, the toggle linkage and the drive shaft are provided at positions which the exhaust gas does not directly hit.

By providing the toggle linkage and the drive shaft at such the position, a disturbance due to exhaust heat for them can be alleviated. Particularly, because when the damper is set at a position that shuts off any of the bypass stack and the HRSG inlet duct, a high temperature exhaust gas becomes not to directly hit the toggle linkage and the drive shaft, it becomes able to effectively alleviate a harmful effect occurring in drive portions of the drive shaft and toggle linkage due to a thermal stress.

The exhaust gas duct may also be configured so as to comprise a plurality of pairs of the HRSG inlet ducts and the bypass stacks, and to be provided with a damper that is provided at a position nearer to the heat recovery steam generator than the bypass stack and can shut off an introduction of the exhaust gas into the heat recovery steam generator; a damper drive that can make the damper selectively perform an opening or closing movement; and a guide mechanism that guides the damper.

In this configuration, by closing all dampers, the exhaust gas becomes not to be introduced into the heat recovery steam generator, and a drastic heat input does not act on the heat recovery steam generator. In addition, by selectively opening a damper, an introduction amount of the exhaust gas introduced into the heat recovery steam generator can be adjusted. Also in this case, because the damper is supported by the exhaust gas duct, a vibration of the damper can be effectively prevented.

DESCRIPTION OF THE PREFERRED EMBODIMENTS

Here will be described embodiments of the present invention in detail, referring to drawings as needed.

First Embodiment

Figure 1:
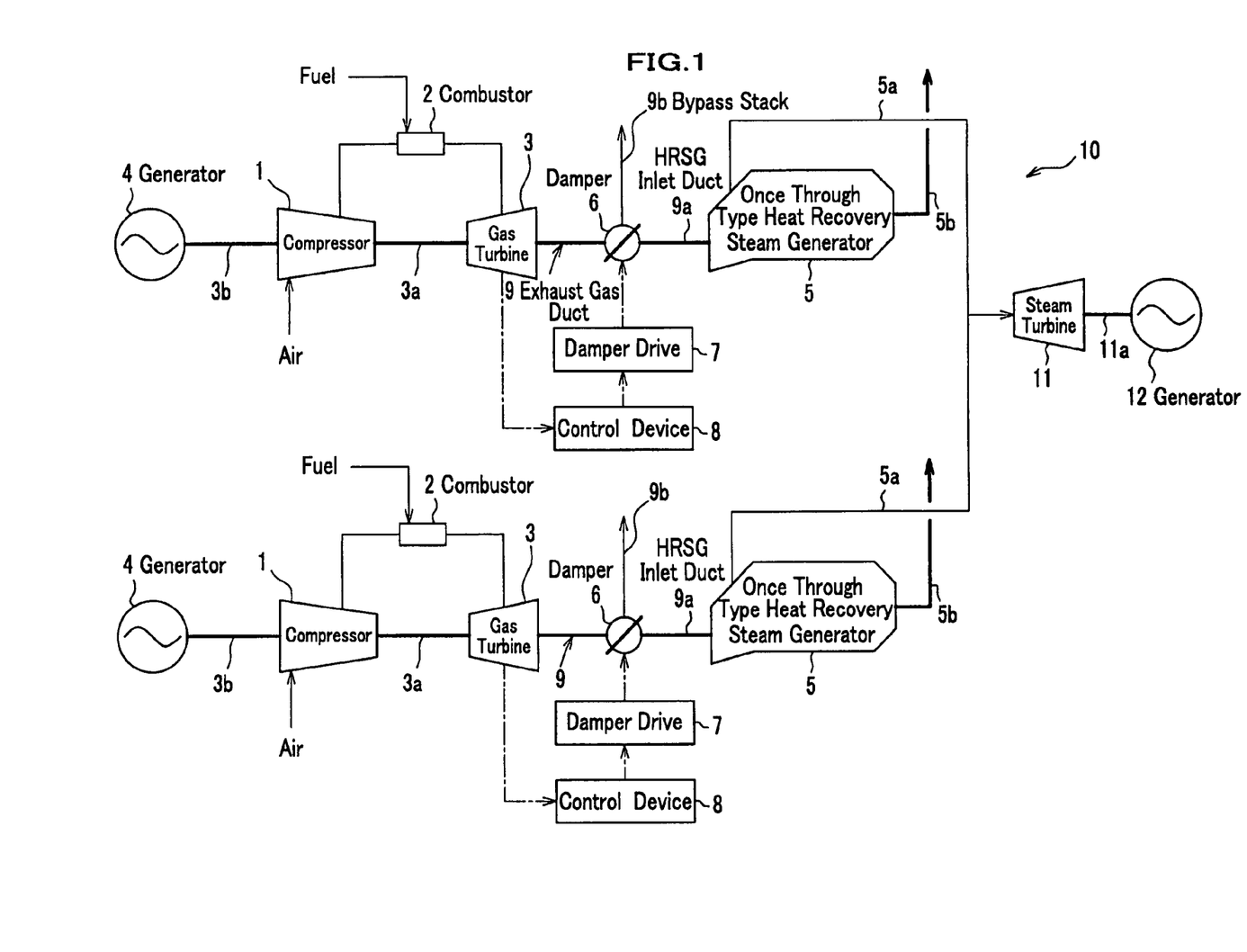
FIG. 1 is a general configuration drawing showing a combined cycle power plant of a first embodiment of the present invention.

As shown in FIG. 1, a combined cycle power plant 10 comprises compressors 1, combustors 2, gas turbines 3, once through type heat recovery steam generators 5, and a steam turbine 11. Meanwhile, although the combined cycle power plant 10 shown in FIG. 1 is a configuration of two systems, it is not limited thereto; it may also be one system, and also not less than three systems.

Each of the gas turbine 3 is coupled to the compressor 1 through a rotor 3a; the compressor 1 is coupled to a generator 4 through a rotor coupling 3b. The compressor 1 compresses sucked air and sends it to the combustor 2. The combustor 2 mixes the compressed air and supplied fuel, combusts them, and produces a high temperature/high pressure combustion gas. At this time, the gas turbine 3 is rotationally driven by the combustion gas produced, the generator 4 is rotationally driven by a rotation torque of the gas turbine 3 through the rotor 3a and the rotor coupling 3b, and thus a power output is generated.

Between the gas turbine 3 and the once through type heat recovery steam generator 5 is provided an exhaust gas duct 9. The exhaust gas duct 9 comprises an HRSG inlet duct 9a for communicating with the once through type heat recovery steam generator 5 and a bypass stack 9b for communicating outside.

A high temperature exhaust gas exhausted from the gas turbine 3 is introduced into the once through type heat recovery steam generator 5, passing through the HRSG inlet duct 9a of the exhaust gas duct 9, and thereafter is exhausted outside, passing through the bypass stack 9b. The once through type heat recovery steam generator 5 recovers heat from the high temperature exhaust gas exhausted from the gas turbine 3, heats water, and produces steam.

Figure 4:
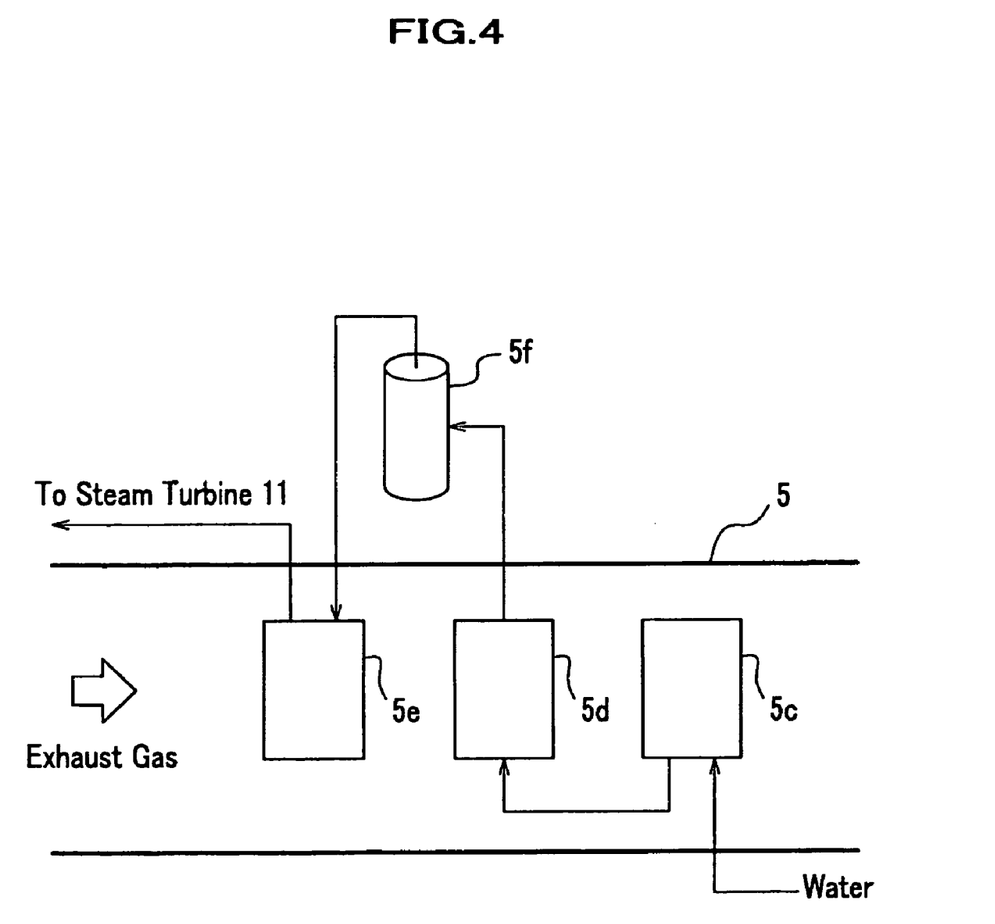
FIG. 4 is a general configuration drawing showing a once through type heat recovery steam generator.

As shown in FIG. 4, the once through type heat recovery steam generator 5 is configured of, for example, an economizer 5c, an evaporator 5d, a superheater 5e, and a separator 5f. The economizer 5c, the evaporator 5d, and the superheater 5e are a heat transfer tube bundle, and recover the heat from the high temperature exhaust gas exhausted from the gas turbine 3. Water sent to the once through type heat recovery steam generator 5 is heated by the economizer 5c, converted to steam by the evaporator 5d, then becomes superheated steam at the superheater 5e via the separator 5f, and is sent to the steam turbine 11 (for example, see Japanese Patent Laid-Open Publication Hei. 6-26606).

Meanwhile, in the embodiment something configured of the compressor 1, the combustor 2, the gas turbine 3, the generator 4, the once through type heat recovery steam generator 5, and the exhaust gas duct 9 is provided in parallel.

Steam produced in each of the once through type heat recovery steam generators 5, 5 is sent to the steam turbine 11 through each of main steam pipes 5a, 5a. The steam turbine 11 is coupled to a generator 12 through a rotor coupling 11a, is rotationally driven by the steam, and a power output is generated from the generator 12. In addition, an exhaust gas, which is introduced into the once through type heat recovery steam generators 5, 5 and of which heat is recovered, is exhausted outside through a stack 5b.

Figure 2:
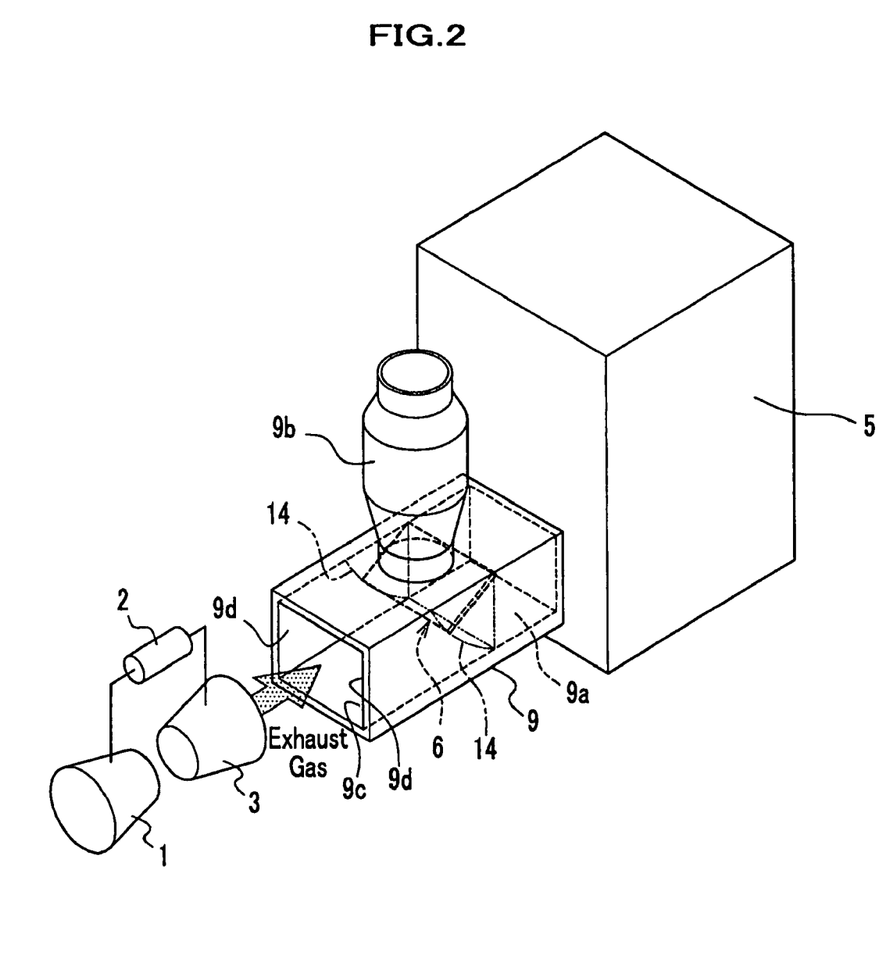
FIG. 2 is a schematic perspective drawing showing part of the combined cycle power plant.

As shown in FIG. 2, the exhaust gas duct 9 comprises an opening 9c at an inlet side thereof, and an exhaust gas exhausted from the gas turbine 3 is introduced into the opening 9c.

Figure 3:
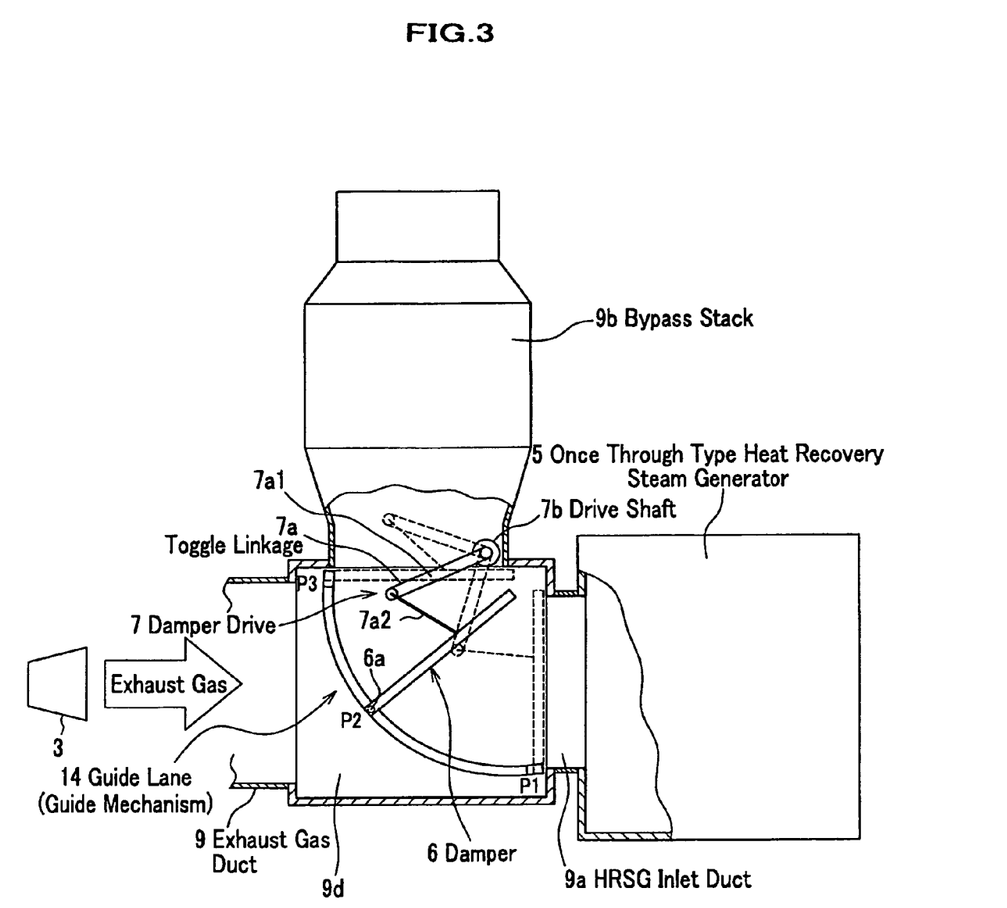
FIG. 3 is a section drawing showing a structure of a damper.

As shown in FIG. 3, in the exhaust gas duct 9 are provided a damper 6, a damper drive 7, and a guide lane (guide mechanism) 14.

The damper 6 is formed of a metal plate and the like, and is a form that can completely shut off the HRSG inlet duct 9a and the bypass stack 9b, respectively. Meanwhile, the damper 6 can be selected from various forms such as a rectangle (see FIG. 2), a round, a triangle, and a polygon.

As shown in FIG. 3, the damper drive 7 comprises a toggle linkage 7a and a drive shaft 7b. The toggle linkage 7a is formed by two arms 7a1, 7a2 being freely rotationally linked: a basis of the arm 7a1 is freely rotationally linked to the drive shaft 7b; an end of the arm 7a2 is freely rotationally linked to one face of the damper 6.

The drive shaft 7b is designed, for example, so as to have an oil pressure piston, so that a motivity from the oil pressure piston is transmitted to the arm 7a1, and so that the arm 7a1 rotationally moves respectively in a clockwise direction and a counterclockwise direction shown in FIG. 3. In addition, a fold angle of the arm 7a2 for the arm 7a1 is designed to be controlled in conjunction with the movement of the arm 7a1.

As shown in FIG. 2, the guide lane 14 is provided on side wall inside faces 9d, 9d of the exhaust gas duct 9. As shown in FIG. 3, the guide lane 14 is a lane formed like an arc at a constant width: one end lying at an upper side thereof lies most in the direction of the gas turbine 3; the other end lying at a lower side thereof lies most in the direction of the once through type heat recovery steam generator 5.

On both side faces of the damper 6 is provided a projection 6a (see FIG. 3), and the projection 6a is freely movably inserted in the guide lane or track 14. Meanwhile, although in FIG. 3 one guide lane 14 and projection 6a nothing but on one side face are shown, similar guide lane 14 and projection 6a are provided on the other side face. Because thus the damper 6 is supported by the toggle linkage 7a and further by the guide lanes 4, 4 provided in the exhaust gas duct 9, a vibration of the damper 6 can be effectively prevented even if a high pressure gas from the gas turbine 3 hits the damper 6. Accordingly, an introduction amount into the HRSG inlet duct 9a and an exhaust amount to the bypass stack 9b can be adjusted in high accuracy. As a result, it is not necessary to make the toggle linkage 7a high in strength and to provide a mechanism for producing a strong driving force at the drive shaft 7b.

Meanwhile, the guide mechanism for making the exhaust gas duct 9 support the damper 6 is not limited thereto. For example, even the mechanism is available where an arc-form step is provided on the side wall inside faces 9d, 9d, and where the damper 6 is guided while abutting with the step. Or else, on the contrary to FIG. 3, the mechanism is available where an arc-form projection of a constant width is provided on the side wall inside faces 9d, 9d, and where a depression is formed on the both side faces of the damper 6 and the depression is freely movably inserted in the projection.

As shown in FIG. 3, in the embodiment the drive shaft 7b is located within the bypass stack 9b. Thus by providing the drive shaft 7b at a side of the bypass stack 9b can be alleviated a problem due to a thermal stress, which occurs by heat of the exhaust gas in drive portions of the toggle linkage 7a and drive shaft 7b. Particularly, because when the damper 6 reaches a position (state indicated by a symbol P3 in FIG. 3) that completely shuts off the bypass stack 9b, the heat of the exhaust gas does not directly hit the drive portions of the toggle linkage 7a and drive shaft 7b, a disturbance occurring in the drive portions due to the thermal stress can be effectively alleviated.

Meanwhile, in the embodiment, in order to further alleviate the disturbance of the drive portions of the toggle linkage 7a and drive shaft 7b due to the heat of the exhaust gas, it may also be designed to provide a water cooling type cooling system and an air cooling type cooling system and to cool the damper 6, the toggle linkage 7a, and the drive shaft 7b.

As shown in FIG. 1, to the damper drive 7 is connected a control device 8. The control device 8 monitors an output of the gas turbine 3 and controls the damper drive 7, based on an output value of the gas turbine 3. Meanwhile, a parameter obtained by the control device 8 is not limited to the output of the gas turbine 3: another condition, for example, even such an exhaust gas temperature is available. In addition, a combination of the output of the gas turbine 3 and the exhaust gas temperature is also available.

Next will be described a series of movements of the combined cycle power plant 10 of the embodiment.

When starting up the combined cycle power plant 10, the damper 6 is set at a position that completely shuts off the HRSG inlet duct 9a of the exhaust gas duct 9, to be more precise, a position (broken line P1 in FIG. 3) where the toggle linkage 7a rotates in the counterclockwise direction as shown in FIG. 3 and the damper 6 completely shuts off the HRSG inlet duct 9a. On the other hand, the bypass stack 9b of the exhaust gas duct 9 becomes full open.

If starting up the combined cycle power plant 10, a combustion gas produced by compressed air and fuel is sent to the gas turbine 3, and it is rotationally driven. After the start-up of the gas turbine 3, an exhaust gas exhausted therefrom is introduced into the exhaust gas duct 9, and all of the exhaust gas is exhausted outside through the bypass stack 9b. Then if an output of the gas turbine 3 reaches a predetermined value (for example, a rated load), the arm 7a1 of the toggle linkage 7a rotates in the clockwise direction by a motivity obtained from the drive shaft 7b. By this movement, in the damper 6 a damper opening of HRSG inlet duct 9a increases; that of the bypass stack 9b decreases. At the same time of the movement, fold angles of the arms 7a1, 7a2 are set at an optimum state. A position of the damper 6 indicated in a solid line P2 shows a state on the way of a rotation movement thereof, and the damper 6 rotates in the clockwise direction till a position, where the HRSG inlet duct 9a finally becomes full open and the bypass stack 9b becomes full close, indicated in the broken line P3 of FIG. 3.

Thus, in a case of moving the damper 6 from the broken line P1 to the broken line P3, because the damper 6 is guided with being supported by the guide lane 14, a load acting on the toggle linkage 7a and the drive shaft 7b becomes able to be reduced even if a high pressure exhaust gas is blown into the damper 6.

By changing the position of the damper 6 as described above, it is enabled to gradually increase an introduction amount of the exhaust gas introduced into the once through type heat recovery steam generator 5. Accordingly, because a drastic heat input into the once through type heat recovery steam generator 5 can be avoided, it is enabled to prevent a breakage thereof. Furthermore, because the gas turbine 3 can be started up at a high speed before the introduction of the exhaust gas into the once through type heat recovery steam generator 5, it is enabled to early take out power.

Furthermore, in a combined cycle power plant will be described effects of cases that a damper is mounted and not mounted, mainly referring to FIGS. 6A, 6B, and 6C.

Figure 6A:
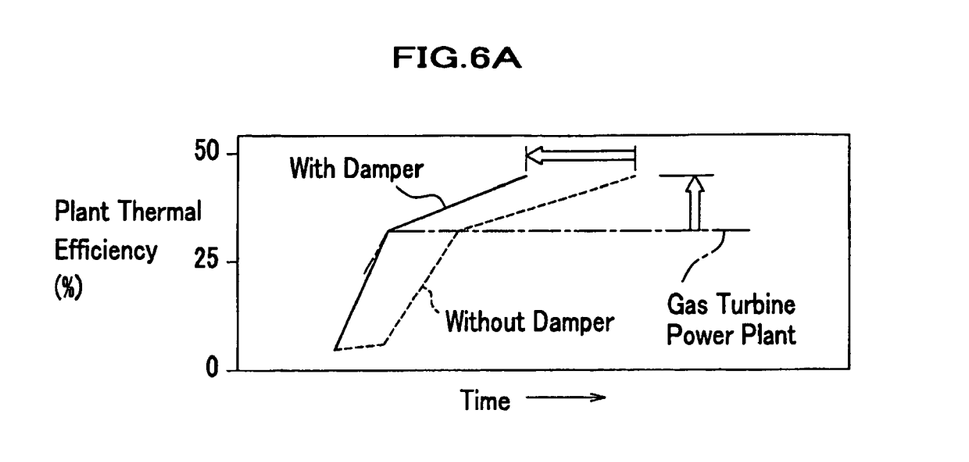
FIG. 6A is a graph showing a relationship between a plant thermal efficiency and a time.
Figure 6B:
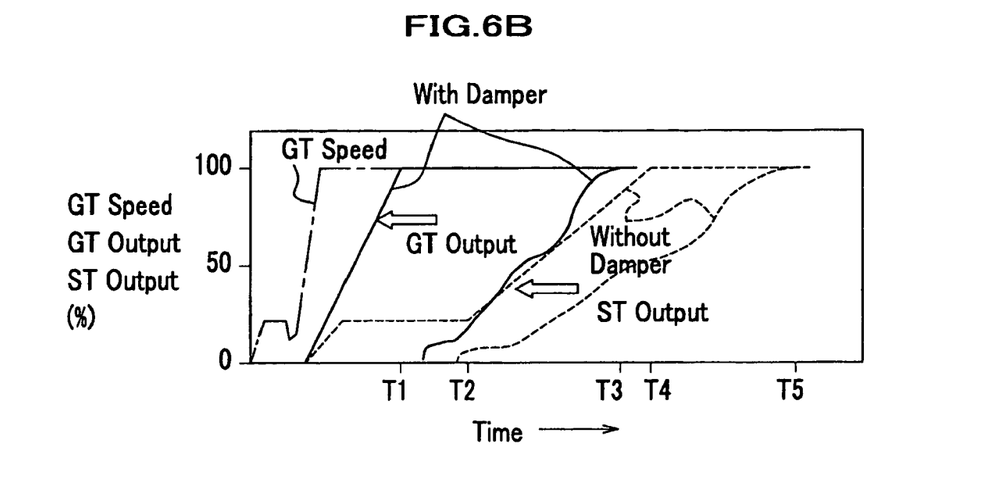
FIG. 6B is a graph showing a relationship between a time and a gas turbine speed, a gas turbine output, and a steam turbine output.
Figure 6C:
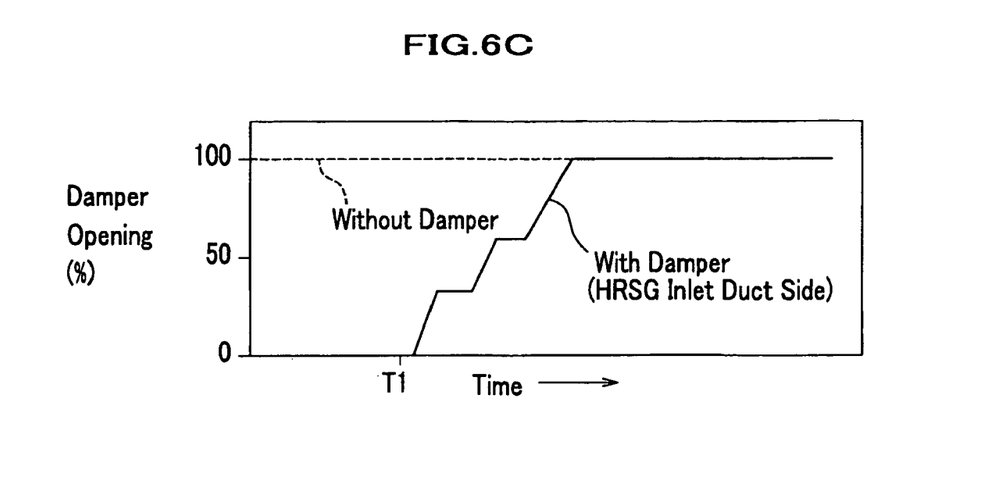
FIG. 6C is a graph showing a relationship between a damper opening and a time.

Meanwhile, in FIGS. 6A, 6B, and 6C solid lines are a case (with a damper) of the damper being mounted; broken lines are a case (without the damper) of the damper being not mounted. However, "without the damper" includes a case that the damper is mounted and a damper opening of an HRSG inlet duct is always set at a state of being full open. In addition, in FIG. 6A a chain line is a case of a plant that uses a simple cycle generation where nothing but a gas turbine is provided.

As shown in FIGS. 6A, 6B, and 6C, in starting up the gas turbine 3 the combined cycle power plant 10 where the damper 6 is mounted starts up at a state (state of the P1 in FIG. 3) of the damper 6 setting the HRSG inlet duct 9a full close (the bypass stack 9b full open). A rotation speed (GT speed) of the gas turbine 3 rises till becoming 100% (maximum speed) along an output line (chain line) shown in FIG. 6B. Then an output (GT output) of the gas turbine 3 rises, based on the GT speed.

The output (GT output) of the gas turbine 3 reaches a rated load (100% output) when a time T1 elapses from a start-up of the gas turbine 3. The control device 8 monitors the GT output and gradually increases a damper opening of the HRSG inlet duct 9a from zero as shown in the solid line of FIG. 6C when judging the GT output reaches the rated load or thereafter. Meanwhile, although not shown, a damper opening of the bypass stack 9b decreases in inverse proportion. Thus the damper opening of the HRSG inlet duct 9a increases, and based on an increase amount thereof increases an introduction amount of the exhaust gas, which is sent into the once through type heat recovery steam generator 5. As a result, a steam amount produced by heat of the exhaust gas increases, and an output (ST output) obtained from the steam turbine 11 gradually rises. Then when the damper opening of the HRSG inlet duct 9a becomes full open or immediately thereafter (after an elapse of a time T3 from the start-up), a maximum ST output is obtained from the steam turbine 11.

Meanwhile, as shown in FIG. 6C, in the combined cycle power plant without the damper, a HRSG inlet duct for introducing an exhaust gas to a heat recovery steam generator is always set full open. Accordingly, as shown in FIG. 6B, the GT output is controlled so as not to exceed a predetermined value till the elapse of a time T2 from a start-up as shown in the broken line so that a drastic heat input does not act on the heat recovery steam generator. After the elapse of the time T2 from the start-up, that is, when the steam turbine 11 becomes a state of being able to output the GT output with exceeding the predetermined value, the combined cycle power plant gradually makes the GT output rise toward 100%: after the elapse of a time T4 from the start-up, the GT output reaches the rated load (100%). Then the ST output increases based on an increase of the GT output, the maximum ST output is obtained after an elapse of a time T5 from the start-up.

Thus in the combined cycle power plant without the damper it takes long time till the GT output becomes the rated load, and it takes longer time by which the ST output becomes the maximum ST output.

On the other hand, in the combined cycle power plant 10 with the damper, because the GT output can be drastically made to rise, it can be early started to take out power from the generator 4 connected to the gas turbine 3. Accordingly, for example, even when a power demand drastically increases, it becomes enabled to early start up the gas turbine 3 till the rated load and to immediately start taking out power.

In addition, as shown in FIG. 6A, the combined cycle power plant 10 with the damper can improve a plant thermal efficiency more than a gas turbine power plant (simple cycle power plant). Furthermore, because the combined cycle power plant 10 with the damper can shorten time by which the plant thermal efficiency same as that of the combined cycle power plant without the damper is obtained, a use amount of fuel can be reduced, and thereby an exhaust amount of carbon dioxide can be reduced.

In addition, because the combined cycle power plant 10 of the embodiment can control the position of the damper 6 in higher accuracy than a conventional combined cycle power plant with a damper, a drastic heat input does not act on the once through type heat recovery steam generator 5.

Second Embodiment

Figure 5:
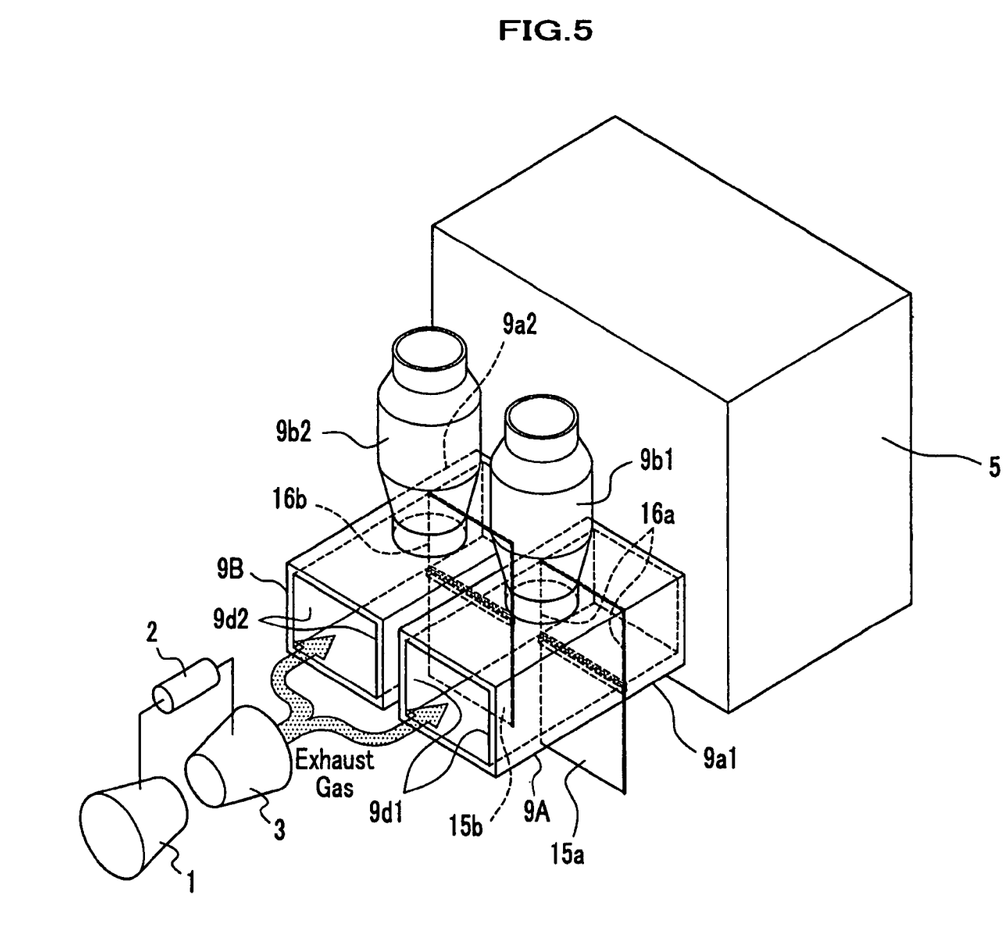
FIG. 5 is a schematic perspective drawing showing part of a combined cycle power plant of a second embodiment of the present invention.

FIG. 5 is a schematic perspective drawing showing part of a combined cycle power plant of a second embodiment of the present invention. Meanwhile, in the embodiment, because part excluding exhaust gas ducts 9A, 9B is same as in the first embodiment, same symbols are appended and descriptions thereof are omitted.

In the second embodiment the exhaust gas ducts 9A, 9B are provided between the gas turbine 3 and the once through type heat recovery steam generator 5. In one exhaust gas duct 9A are provided a HRSG inlet duct 9a1 and a bypass stack 9b1; in the other exhaust gas duct 9B are provided a HRSG inlet duct 9a2 and a bypass stack 9b2. Meanwhile, a form of the exhaust gas ducts 9A, 9B is not limited thereto, and for example, may be a fork-form where inlets of the exhaust gas ducts 9A, 9B are integrated.

In the exhaust gas ducts 9A, 9B are provided dampers 15a, 15b and guide lanes 16a, 16b functioning as a guide mechanism. The dampers 15a, 15b are provided at a position nearer to the once through type heat recovery steam generator 5 than the bypass stacks 9b1, 9b2, and can move to states of making the HRSG inlet ducts 9a1, 9a2 full open and full close. The guide lanes 16a, 16b are formed on side wall inside faces 9d1, 9d2 and freely movably support the dampers 15a, 15b.

Meanwhile, although not shown, at each of the dampers 15a, 15b are provided a damper drive and a control device same as in the first embodiment. The damper drive comprises a member for producing a motivity for linearly moving the dampers 15a, 15b in up/down directions. The control device controls the damper drive, based on the output of the gas turbine 3 and selectively opens the dampers 15a, 15b. For example, when the output of the gas turbine 3 reaches the rated load, the control device opens either one of the dampers 15a, 15b, thereafter opens a remaining shut-off member, and thereby can stepwisely increase an introduction amount of an exhaust gas into the once through type heat recovery steam generator 5.

In the second embodiment same as in the first embodiment, because the dampers 15a, 15b are supported by the guide lanes 16a, 16b, vibrations of the dampers 15a, 15b can be effectively prevented.

Meanwhile, the number and form of the exhaust gas ducts and the configuration of the dampers in the second embodiment are one example, and they can be appropriately changed within a range of not departing from the spirit of the invention.

In addition, in the first embodiment, although the description is made with citing the configuration of using the single damper 6 as an example, it may also be designed, for example, to combine two dampers and provide in an exhaust gas duct a guide lane (guide mechanism) for guiding each damper, and to control an introduction amount into the once through type heat recovery steam generator 5 by one damper and an exhaust amount by the other damper. Thus by being configured of a plurality of dampers, the dampers and the like can be made light in weight, and damper drives for driving the dampers can be made lower in driving force.

What is claimed is:

1. A combined cycle power plant comprising:
   a compressor;
   a combustor for combusting supplied fuel together with compressed air compressed by said compressor;
   a gas turbine driven by a combustion gas exhausted from said combustor;
   a heat recovery steam generator (HRSG) for recovering high temperature gas exhausted from said gas turbine;
   a steam turbine driven by steam obtained from said heat recovery steam generator;
   an exhaust gas duct, provided between said gas turbine and said heat recovery steam generator, comprising an HRSG inlet duct that introduces said exhaust gas into said heat recovery steam generator and a bypass stack that leads said exhaust gas outside;

a damper provided in said exhaust gas duct and configured to control a ratio of an exhaust amount of said exhaust gas to said bypass stack and an introduction amount of said exhaust gas into said HRSG inlet duct by changing any of an angle and opening of said damper;

a damper drive for changing any of the angle and opening of said damper so that an exhaust amount of said exhaust gas to said bypass stack decreases in increasing an introduction amount of said exhaust gas into said HRSG inlet ducts;

a control device operatively connected with the damper drive to control the damper drive based on any of an output value and exhaust gas temperature of the gas turbine so as to selectively fully open the bypass stack and fully close the HRSG inlet duct upon start up of the combined cycle power plant, to decrease said exhaust amount of said exhaust gas to the bypass stack and increase said introduction amount of said exhaust gas to the HRSG inlet duct upon any of the output value and exhaust gas temperature of the gas turbine being a predetermined value, and to fully close the bypass stack and fully open the HRSG inlet duct; and a guide mechanism for preventing a vibration of said damper, said guide mechanism including a track between an inner face of a side wall of said exhaust gas duct and a side face of said damper and extending between the fully closed position for said bypass stack and the fully closed position for said HRSG inlet duct.

2. A combined cycle power plant according to claim 1, wherein said heat recovery steam generator is a once through type heat recovery steam generator.

3. A combined cycle power plant according to claim 1, wherein said damper drive comprises a toggle linkage for supporting said damper and a drive shaft for transmitting a driving force to said toggle linkage, and wherein when said damper reaches a position that shuts off said bypass stack, said toggle linkage and said drive shaft are at positions which said exhaust gas does not directly impinge there upon.

4. A combined cycle power plant according to claim 2, wherein said damper drive comprises a toggle linkage for supporting said damper and a drive shaft for transmitting a driving force to said toggle linkage, and wherein when said damper reaches a position that shuts off said bypass stack, said toggle linkage and said drive shaft are at positions which said exhaust gas does not directly impinge there upon.

5. A combined cycle power plant comprising:

a compressor;

a combustor for combusting supplied fuel together with compressed air compressed by said compressor;

a gas turbine driven by a combustion gas exhausted from said combustor;

a heat recovery steam generator (HRSG) for recovering high temperature gas exhausted from said gas turbine;

a steam turbine driven by steam obtained from said heat recovery steam generator;

a plurality of exhaust gas ducts provided between said gas turbine and said heat recover steam generator, each comprising an HRSG inlet duct and a bypass stack, said HRSG inlet duct introducing said exhaust gas into said heat recovery steam generator and said bypass stack leading said exhaust gas outside;

a damper provided in each said exhaust gas duct and a position nearer to said heat recovery steam generator than said bypass stack and configured to shut off the introduction of said exhaust gas into said heat recovery steam generator;

a damper drive that changes any of an angle and opening of said each damper so that an exhaust amount of said exhaust gas to said bypass stack decreases in increasing the introduction amount of said exhaust gas into said HRSG inlet duct, and makes said damper selectively perform an opening or closing movement;

a control device operatively connected with said damper drive for selectively opening and closing each said damper; and a guide mechanism for preventing a vibration of said damper and guiding said damper, said guide mechanism including a track between an inner face of a side wall of said exhaust gas duct and a side face of said damper and extending between fully open position and fully closed position for said HRSG inlet duct.

6. A combined cycle power plant according to claim 5, wherein said heat recovery steam generator is a once through type heat recovery steam generator.

7. A combined cycle power plant according to claim 1, wherein said guide mechanism includes a step provided on said inner face of said side wall of said exhaust gas duct, and a projection provided on said side face of said damper so as to be freely movably guided while abutting said step.

8. A combined cycle power plant according to claim 1, wherein said guide mechanism includes a projection provided on said inner face of said side wall of said exhaust gas duct and a depression provided on a side face of said damper, said projection being insertable in said depression which guides said damper.

9. A combined cycle power plant according to claim 5, wherein said guide mechanism includes a step provided said an inner face of said side wall of said exhaust gas duct, and a projection provided on said side face of said damper so as to be freely movably guided while abutting with said step.

10. A combined cycle power plant according to claim 5, wherein said guide mechanism includes a projection provided on said inner face of said side wall of said exhaust gas duct and a depression provided on said side face of said damper, said projection being insertable in said depression which guides said damper.

11. A combined cycle power plant according to claim 5, wherein said control device is configured to control said damper device, based on any of an output value and exhaust gas temperature of said gas turbine, to open one of said dampers upon any of the output value and the exhaust gas temperature of said gas turbine being a predetermined value, and to open a remaining damper of said dampers.

12. A combined cycle power plant comprising:

a compressor;

a combustor for combusting supplied fuel together with compressed air compressed by said compressor;

a gas turbine driven by a combustion gas exhausted from said combustor;

a heat recovery steam generator (HRSG) for recovering a high temperature gas exhausted from said gas turbine;

a steam turbine driven by steam obtained from said heat recovery steam generator;

an exhaust gas duct, provided between said gas turbine and said heat recovery steam generator, comprising an HRSG inlet duct that introduces said exhaust gas into said heat recovery steam generator and a bypass stack that leads said exhaust gas outside;

a damper provided in said exhaust gas duct and configured to control a ratio of an exhaust amount of said exhaust gas to said bypass stack and an introduction amount of said exhaust gas into said HRSG inlet duct by changing any of an angle and opening of said damper; a damper drive for changing any of the angle and opening of said damper so that an exhaust amount of said exhaust gas to said bypass stack decreases in increasing the introduction amount of said exhaust gas into said HRSG inlet duct; and a guide mechanism for preventing a vibration of said damper, said guide mechanism including a track between an inner face of a side wall of said exhaust gas duct and a side face of said damper and extending between the fully closed position for said bypass stack and fully closed position for said HRSG inlet duct.

* * * * *